UNITED STATES PATENT OFFICE.

EUGEN OSTERMAYER, OF BIEBERATH, AND MAX DITTMAR, OF KÖNIGSBERG, GERMANY.

PRODUCING CHLORIODINE DOUBLE COMBINATIONS FROM PYRIDINE AND CHINOLINE BASES.

SPECIFICATION forming part of Letters Patent No. 332,358, dated December 15, 1885.

Application filed June 20, 1884. Serial No. 135,534. (Specimens.)

*To all whom it may concern:*

Be it known that we, EUGEN OSTERMAYER, doctor of philosophy, a subject of the King of Würtemberg, residing at Bieberath, Würtemberg, German Empire, and MAX DITTMAR, doctor of philosophy, a subject of the King of Prussia, residing at Königsberg, Prussia, German Empire, have invented certain new and useful Improvements in the Processes of Manufacturing Chloriodic Bases; and we do hereby declare the following to be a full, clear, and exact description of the invention, such as will enable others skilled in the art to which it appertains to make and use the same.

The object of our invention is to obtain coloring-matter from chloriodine double combinations; and it relates to a process of producing chloriodine double combinations of chinoline, pyridine, naphtochinoline, or chinoline chlormethylate, from which coloring-matter may be obtained; and it consists, essentially, in treating these bases with chloried chlorhydrogen, so-called "chloriod-hydrochloric acid." The latter may be obtained by the direct introduction of chlorine into water in which iodine is held in suspension or in a state of division, or by treating an iodine combination in a solution of hydrochloric acid with an oxidizing agent, or with such bodies or chemicals that will give off free chlorine in presence of hydrochloric acid—as, for instance, by the treatment of iodide of potassium with hydrochloric acid and sodium nitrite. The fluid reagent obtained by either of these methods consists of a double combination of the chloriodine, and is expressed by the formula IClHCl. The result of the reaction of the chloriod-hydrochloric acid on the above-described bases, according as the chinolines themselves or their chlormethylates are employed, may be expressed by the following formulæ: first, $C^9H_7N + IClHCl = C_9H_8NICl_2$ chinoline + chloriod-hydrochloric acid = hydrochloric acid chinoline chloriodine; or, second, $C_9H_7NCH_3Cl + IClHCl = C_9H_7NCH_3ClICl + HCl$ chinoline chlormethylate + chloriod-hydrochloric acid = chinoline-chlormethylate chloriodine+hydrochloric acid. The combinations formed according to the first formula give off hydrochloric acid when lixiviated in cold water, and may therefore be readily converted into the free chloriod bases, the resulting process being expressed by the following formula: $C_9H_8NICl_2 = C_9H_7NICl + HCl$ chloriod-chinoline.

In practically carrying out our invention we proceed as follows: In order to obtain the chloriod-hydrochloric acid we dissolve five kilograms of iodide of potassium in a like weight of cold water, and add to the solution twenty-five kilograms hydrochloric acid. To this solution we gradually add 4.6 kilograms sodium nitrite until a clear yellow liquor is obtained, containing a given amount of iodine; or five kilograms of iodine are suspended in four times its weight of water, into which chlorine is introduced until all the iodine is dissolved, so that this solution will also contain a given volume of chloriod-hydrochloric acid. If, now, the fluid reagent obtained from five kilograms of iodide of potassium, twenty-five kilograms of hydrochloric acid, and 4.6 kilograms of sodium nitrite is mixed with 3.85 kilograms of chinoline, an orange-yellow precipitate is obtained, which is chloriod-chinoline hydrochlorate. By filtering off this precipitate and lixiviating it rapidly in a large volume of water free chloriod-chinoline is obtained according to the above-described reaction, which may be regarded as an additional product and preserved in a pure state by drying and crystallization. By substantially the same proceeding any of the other described bases, instead of the chinoline, can be converted into chloriod double combinations, in that their hydrochloric solutions are mixed with the chloriod-hydrochloric acid containing a given volume of iodine, according to their molecular relation.

It may be remarked that in the production of the chloriod-hydrochloric acid, as well as in the precipitation of the dissolved bases with the fluid reagent, the temperature should be kept as low as possible.

What we claim is—

The herein-described process of producing double combinations of chloriodine with pyridine, chinoline, tetrahydrochinoline or chinoline methylate by treating these bases with chloriod-hydrochloric acid, substantially as set forth.

In testimony whereof we affix our signatures in presence of two witnesses.

EUGEN OSTERMAYER.
MAX DITTMAR.

Witnesses:
F. VOGELER,
J. GRUND.